2,770,528

BARIUM FERROUS GROUP METAL TERNARY SULFIDES AND THEIR PREPARATION

John T. Maynard, Wilmington, Del., assignor to E. I. du Pont de Nemours and Company, Wilmington, Del., a corporation of Delaware No Drawing. Application March 15, 1954,
Serial No. 416,437

13 Claims. (Cl. 23—134)

This invention relates to new ternary metal sulfides and to methods for their preparation. More particularly this invention relates to new ternary sulfides of an alkaline earth metal with a ferrous group metal.

Ternary sulfides of alkaline earth metals with group V–B elements are known, e. g., $CaAs_2S_4 \cdot 8H_2O$, and $Ca_2As_2S_5 \cdot 9H_2O$, Bull. soc. chim. 45, 903 (1929); $Ca_3As_2S_6$, J. Soc. Leather Trade Chem. 8, 471 (1924); $BaBi_2S_4$ and $SrBi_2S_4$, Z. anorg. chim. 211, 209 (1933), as are also the ternary sulfides of alkali metals with iron, e. g., $KFeS_2$, Rec. trav. chim. 63, 69 (1944). However, no ternary sulfides having an alkaline earth metal to a ferrous group of metal ratio of 1:1 have heretofore been known.

It is an object of this invention to provide new ternary metal sulfides and methods for their preparation. A further object is to provide certain new ternary sulfides of an alkaline earth metal with a ferrous group metal. Other objects will appear hereinafter.

These objects are accomplished by the following invention which provides new ternary sulfides of barium with a ferrous group metal. In these new ternary sulfides, the sulfur is chemically combined with barium and with a ferrous group metal, i. e., with iron, nickel or cobalt.

The new ternary sulfides of this invention are conveniently made by sintering a barium sulfide with a binary sulfide of a ferrous group metal, e. g., iron (II) sulfide, in an inert atmosphere. A convenient method of operating is by bringing an inert gas, e. g., nitrogen or helium, in contact with a 1:1 mole mixture of the barium sulfide and sulfide of iron (II), nickel (II), or cobalt (II) heated to between 500 and 1400° C. Instead of the preformed sulfides, the sulfides can be made in situ by passing hydrogen sulfide over a mixture of an oxide or hydroxide of barium and an oxide or hydroxide of iron, nickel, or cobalt heated to a temperature which is at least 500° C. until evolution of sulfur and water has ceased. Thereafter the hydrogen sulfide may be replaced by a stream of inert gas, e. g., helium or nitrogen, and the temperature raised to between 800° and 1400° C., where it is held for from 10 minutes to 6 hours.

The X-ray diffraction data given in the examples were obtained by the Debye-Scherrer powder method with a North American Phillips unit, using K-alpha radiation as described in the examples. In this method, the sample is finely ground and packed into a capillary tube, which is mounted in a camera having a 114.9 mm. diameter.

In the tabulations of diffraction data in the examples, the heading "I" refers to the observed intensity values and "d" to the interplanar spacings expressed in angstrom (A.) units. The letter S designates the strongest line recorded; $M_1$, $M_2$, $M_3$, and $M_4$ are lines of medium intensity, the order of intensity decreasing with increasing numerical sequence, F means that the line is faint, and V that it is very weak.

The following examples, in which the reactant proportions are expressed in parts by weight, are submitted to further illustrate but not to limit the present invention.

EXAMPLE I

An equimolar mixture of barium sulfide and ferrous sulfide was placed in a refractory boat within a tube furnace, through which a stream of hydrogen sulfide was passed. The furnace was heated, over a period of two hours, to about 900° C. and held at 900° C. for about 90 minutes. It was then allowed to cool. The product obtained was a black, fused, crystalline substance, and an X-ray powder pattern showed it to consist almost entirely of a new, previously unknown compound containing a small amount of unreacted ferrous sulfide.

EXAMPLE II

A mixture of 33.8 parts of barium sulfide, 17.78 parts of ferrous sulfide, and 13.3 parts of sulfur was ground in a mortar to ensure thorough mixing. It was then heated in a covered crucible in a muffle furnace, through which a current of nitrogen was flowing, to a temperature of 950° C. The furnace was held at this temperature for about 30 minutes and was then allowed to cool. The product was found to be a black, fused, crystalline mass having the following composition: Ba, 50.35%; Fe, 20.44%; S, 27.97%. This analysis corresponds to the composition $Ba_5Fe_5S_{12}$.

The X-ray powder pattern of this product was the same as that of the major phase of the product of Example I and showed no evidence of residual barium or iron sulfide. It finds no counterpart in the ASTM file of known diffraction data.

*X-ray diffraction data on barium iron sulfide reaction product*

| d | I | d | I | d | I |
|---|---|---|---|---|---|
| 4.42 | F | 2.12 | F | 1.41 | V |
| 3.84 | $M_2$ | 2.04 | F | 1.345 | F |
| 3.64 | $M_1$ | 1.95 | F | 1.31 | $M_4$ |
| 3.34 | F | 1.92 | $M_3$ | 1.26 | F |
| 3.13 | F | 1.83 | $M_3$ | 1.21 | V |
| 2.95 | S | 1.79 | $M_4$ | 1.135 | V |
| 2.83 | V | 1.71 | F | 1.11 | F |
| 2.58 | $M_3$ | 1.64 | F | 1.07 | V |
| 2.46 | $M_2$ | 1.54 | $M_4$ | 1.04 | F |
| 2.32 | F | 1.49 | F | 0.979 | V |
| 2.21 | $M_4$ | 1.45 | | | |

When the above barium iron sulfide reaction product was finely pulverized and ground into a typical linseed oil finish composition, panels painted with the resulting suspension and allowed to dry were found to have a tough, flexible flat black finish. The covering power of the barium iron sulfide as a pigment appeared to be excellent.

EXAMPLE III

An intimate mixture of 4.51 parts of barium sulfide, 2.37 parts of ferrous sulfide, and 1.8 parts of sulfur was placed in a graphite boat and heated in a furnace to 800° C., over a period of two hours, in an atmosphere of hydrogen sulfide. The hydrogen sulfide atmosphere was then replaced with one of helium and the furnace heated to 1060° C. over another two hours. The furnace was then allowed to cool slowly. The product was found to be a well-crystallized, dense compound similar to those of the previous examples. A small fragment of this product, which appeared to be essentially a single crystal, was found to have a volume resistivity of $1.8 \times 10^4$ ohm, indicating that this barium iron sulfide had conductivity in the semiconductor range.

EXAMPLE IV

A mixture of equimolar quantities of barium carbonate and ferrous sulfide was heated in a platinum boat in a stream of hydrogen sulfide to a temperature of 900° C. for a period of three hours. The product was a black, fused, crystalline mass similar in appearance to the products of the previous examples. The X-ray powder pattern was identical to that of Example II, thus showing it to be the same compound as that obtained by the other procedures.

EXAMPLE V

A mixture of 3.39 parts of barium sulfide and 1.18 parts of powdered cobalt metal was heated in a refractory boat in a tube furnace, through which a stream of hydrogen sulfide was flowing, to a temperature of 800° to 850° C. After about three hours, the furnace was allowed to cool. The product was a black, crystalline, fused solid having the following composition: Ba, 48.53%; Co, 23.34%; S, 25.57%. This analysis indicates that the composition was essentially $BaCoS_2$.

The X-ray powder pattern, obtained with FeK-alpha radiation, showed no evidence for barium or cobalt sulfide but consisted of a pattern which finds no counterpart in the ASTM files of known diffraction data. This indicated formation of a previously unknown compound, barium cobalt sulfide. The lines of this pattern were as follows:

*X-ray diffraction data on barium cobalt sulfide reaction product*

| d | I | d | I | d | I |
|---|---|---|---|---|---|
| 3.93 | F | 2.45 | F | 1.81 | F |
| 3.78 | F | 2.39 | F | 1.66 | S |
| 3.69 | F | 2.30 | F | 1.58 | F |
| 3.32 | $M_2$ | 2.27 | F | 1.48 | F |
| 3.00 | $M_4$ | 2.11 | $M_1$ | 1.46 | F |
| 2.86 | $M_4$ | 2.075 | F | 1.43 | F |
| 2.76 | F | 1.84 | F | 1.41 | F |
| 2.63 | F | | | | |

EXAMPLE VI

A mixture of 3.39 parts of barium sulfide and 1.17 parts of nickel powder was heated as in Example V to yield a black, fused, crystalline solid having the composition Ba, 47.72%; Ni, 24.73%; S, 24.45%. This analysis indicated that the composition was essentially $BaNiS_2$. The X-ray powder pattern, taken with CuK-alpha radiation through a nickel screen, showed a small amount of unreacted barium sulfide and nickel sulfide. Lines were also present which have no counterpart in the ASTM files of known diffraction data, indicating formation of a new compound, barium nickel sulfide as follows:

*X-ray diffraction data on barium nickel sulfide reaction product*

| d | I | d | I | d | I |
|---|---|---|---|---|---|
| 4.41 | F | 2.21 | $M_2$ | 1.65 | $M_4$ |
| 3.93 | $M_3$ | 2.15 | $M_4$ | 1.56 | F |
| 3.12 | S | 1.805 | F | 1.39 | F |
| 2.45 | $M_3$ | 1.77 | $M_3$ | 1.18 | F |

The ternary sulfides of this invention contain sulfur in chemical combination and conform to the general formula $BaMS_x$, in which M is a ferrous group metal and x is 2 to 2.5.

In Example I the ternary sulfide has been made by sintering a 1:1 gram mole mixture of binary sulfides in a hydrogen sulfide atmosphere and in Examples II and III sulfur has been included in the initial reaction charge in order to consume and exclude oxygen from the system. In Example IV $BaCO_3$ has been sintered with iron sulfide in a 1:1 gram mole ratio in the presence of hydrogen sulfide and in Examples V and VI the free ferrous group metal, namely, cobalt and nickel respectively, has been sintered with barium sulfide in a hydrogen sulfide atmosphere. When the oxide, hydroxide, carbonate, or free metal is used, it is desirable to effect the sulfidation in two steps, namely, by first sulfiding the binary mixture at a temperature of at least 500° C. until water and sulfur or hydrogen cease to be evolved, then replacing the sulfiding agent with an inert gas, e. g., nitrogen or helium, and completing the reaction at 800°–1400° C.

The time of reaction depends upon the nature of the reactants, the temperature, and concentration of the hydrogen sulfide or inert gas, as the case may be. With mixed oxides, the reaction is carried on until water no longer appears in the discharge gases. With the free metals, the reaction is carried on until hydrogen is no longer being formed, and with the metal sulfides until sulfur is no longer present in the discharge gases. Irrespective of the nature of the reactants of mode of reaction, the sintering reaction at 800° to 1400° C. is permitted to proceed for no less than 10 minutes or more than six hours.

The process is carried out at temperatures which are at least 500° C. but below 1400° C. The lower temperatures are used when mixed oxides are being sulfided. After the sulfidation reaction is complete the sulfiding agent can be replaced by an inert gas, such as helium, nitrogen, etc., and the reaction completed at 800°–1400° C.

The sulfides of barium usefully employable in the preparation of the ternary sulfides of this invention are barium monosulfide and barium tetrasulfide. Barium carbonate also can be used as shown by Example IV.

The ferrous group metals are iron, nickel, and cobalt. These are preferably used as sulfides.

In general, it is preferred to employ the sulfides of the above metals in preparing the ternary sulfides. Alternatively, the oxides or hydroxides can be used, if desired.

Hydrogen sulfide has been used in the examples as the sulfiding agent. In its place there can be used any material which under the conditions of reaction gives rise to hydrogen sulfide.

The process is conducted at atmospheric pressure and this has practical advantages in simplifying equipment requirements and reducing costs.

The ternary sulfides of this invention are useful as pigments and opacifiers in ceramic glazes, enamels, and glasses, as semiconductive elements in electronic devices, etc.

As many apparently widely different embodiments of this invention may be made without departing from the spirit and scope thereof, it is to be understood that this invention is not limited to the specific embodiments thereof except as defined in the appended claims.

I claim:

1. A barium ferrous group metal ternary sulfide conforming to the general formula $BaMS_x$ wherein M is a ferrous group metal, x is 2 to 2.5, and the ratio of barium to ferrous group metal is 1:1.

2. Barium iron sulfide conforming to the formula $Ba_5Fe_5S_{12}$.

3. Barium cobalt sulfide conforming to the formula $BaCoS_2$.

4. Barium nickel sulfide conforming to the formula $BaNiS_2$.

5. Process for preparing a barium ferrous group metal ternary sulfide which comprises sintering barium sulfide with a binary sulfide of a ferrous group metal at a temperature of 800° to 1400° C., in an atmosphere of hydrogen sulfide, and recovering as the resulting reaction product a barium ferrous group metal ternary sulfide wherein the ratio of barium to ferrous group metal is 1:1.

6. Process for preparing a barium ferrous group metal ternary sulfide as set forth in claim 5 wherein said binary sulfide of the ferrous group metal is formed in situ by bringing hydrogen sulfide into contact with said ferrous group metal at a temperature of at least 500° C.

7. Process for preparing a barium ferrous group metal ternary sulfide as set forth in claim 5 wherein said barium sulfide is formed in situ by bringing hydrogen sulfide into contact with barium carbonate at a temperature of at least 500° C.

8. Process for preparing a barium ferrous group metal ternary sulfide which comprises sintering barium sulfide with ferrous sulfide at a temperature of 800° to 1400° C., in an atmosphere of hydrogen sulfide, and recovering as the resulting reaction product a barium iron sulfide wherein the ratio of barium to iron is 1:1.

9. Process for preparing a barium ferrous group metal ternary sulfide as set forth in claim 8 wherein said barium sulfide is formed in situ by bringing hydrogen sulfide into contact with barium carbonate at a temperature of at least 500° C.

10. Process for preparing a barium ferrous group metal ternary sulfide which comprises sintering barium sulfide with cobalt sulfide at a temperature of 800° to 1400° C., in an atmosphere of hydrogen sulfide, and recovering as the resulting reaction product a barium cobalt sulfide wherein the ratio of barium to cobalt is 1:1.

11. Process for preparing a barium ferrous group metal ternary sulfide as set forth in claim 10 wherein said cobalt sulfide is formed in situ by bringing hydrogen sulfide into contact with cobalt at a temperature of at least 500° C.

12. Process for preparing a barium ferrous group metal ternary sulfide which comprises sintering barium sulfide with nickel sulfide at a temperature of 800° to 1400° C., in an atmosphere of hydrogen sulfide, and recovering as the resulting reaction product a barium nickel sulfide wherein the ratio of barium to nickel is 1:1.

13. Process for preparing a barium ferrous group metal ternary sulfide as set forth in claim 12 wherein said nickel sulfide is formed in situ by bringing hydrogen sulfide into contact with nickel at a temperature of at least 500° C.

References Cited in the file of this patent
UNITED STATES PATENTS 2,500,958    O'Brien    Mar. 21, 1950

OTHER REFERENCES

Mellor: "Treatise on Inorganic and Theoretical Chemistry" (1935), vol. 14, part 3, pages 194 and 757, vol. 15, pages 443 and 444.